UNITED STATES PATENT OFFICE.

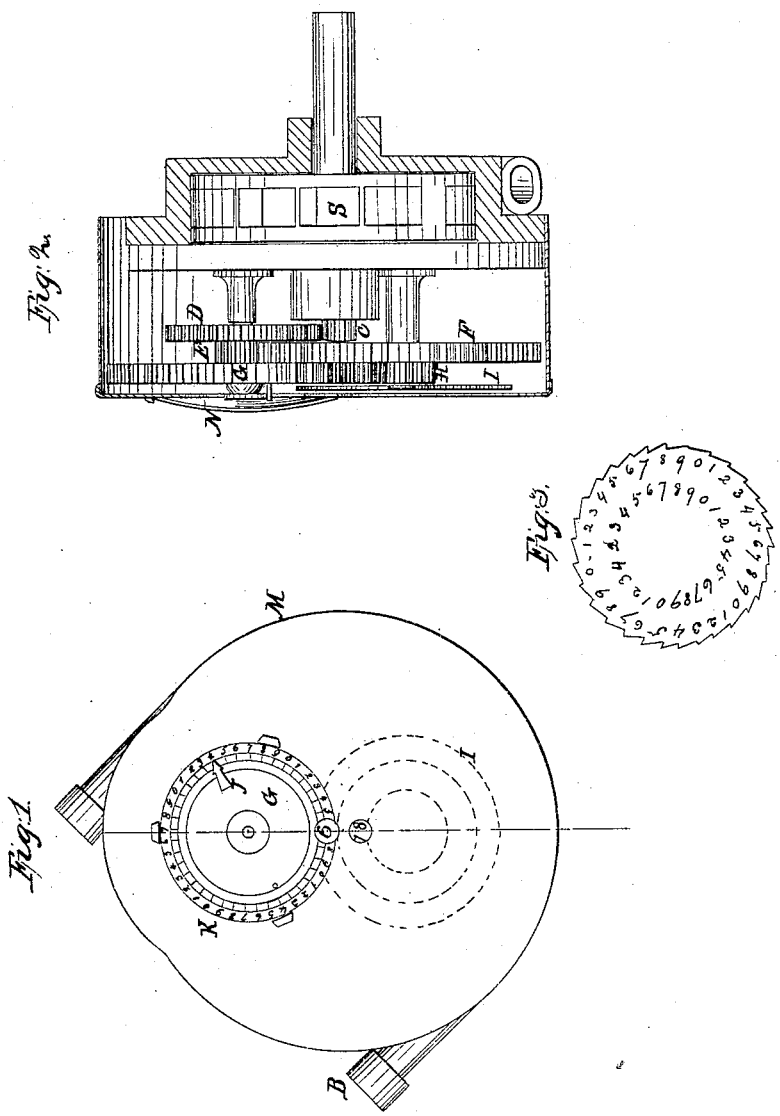

HENRY S. WALCOTT, OF BOSTON, ASSIGNOR TO JAMES D. SUMNER, OF LEXINGTON, MASSACHUSETTS.

IMPROVEMENT IN WATER-METERS.

Specification forming part of Letters Patent No. 50,307, dated October 3, 1865.

*To all whom it may concern:*

Be it known that I, HENRY S. WALCOTT, of Boston, Suffolk county, and State of Massachusetts, have invented an Improved Rotary Water-Meter; and I do hereby declare the following to be an exact description thereof, reference being had to the accompanying drawings, and to the letters of reference marked thereon, making a part of this specification.

The nature of my invention consists in the shape, construction, and combination of the water-wheel, its box, and pipes; also, the arrangement of the counter, indicator, and case, for the purpose of measuring the flow of water with accuracy.

Figure 1 is a front view of the meter; Fig 2, a sectional view. Fig. 3 shows the counter.

A represents the receiving-pipe, that the water enters and flows regularly upon the angular buckets of the wheel S, drives the wheel, and discharges again at the opposite pipe, B. Upon the shaft of the water-wheel S is a pinion, C, that gears into an upper toothed wheel, D, that drives a pinion, E, that revolves the toothed wheel F. The toothed wheel F drives a pinion, H, that revolves the plate I or counter, by which the whole number of revolutions of the wheel is designated. As the pinion H drives the toothed wheel G, the wheel G carries the index-point J with it, and each revolution of the index-point J indicates, say, one hundred and fifty revolutions of the wheel, and each point on the plate or indicator K shows the number of gallons of water used, supposing each revolution of the water-wheel S to discharge its certain number of gallons, the indicator being marked into thirty-seconds, and supposing each mark to indicate one or five gallons, according to the accurate measurement of the water wheel and its discharge of water, as tested and fixed.

I intend to reduce or increase the gearing according to the speed required.

I inclose the gearing and counter I in a solid case, M, and attach the indicator K, which is covered with a glass, N'. Below the indicator are one, two, three, or more apertures, P, one below the other, so that the number on the counter I is distinctly seen, and by the second or third aperture the whole amount is doubled, trebled, or fixed to show the whole number of gallons used, to any amount.

What I claim as my invention, and desire to secure by Letters Patent, is—

1. The water-wheel S, constructed as specified, when arranged, in combination with its wheel-box and pipes A and B, as herein described, and for the purposes set forth.

2. In combination with the above, the counter I and the indicator K, with the case M, when arranged as herein described, and for the purposes set forth.

H. S. WALCOTT.

Witnesses:
J. FRANKLIN REIGART,
JOHN S. HOLLINGSHEAD.